(12) United States Patent
Boufarhat

(10) Patent No.: US 11,475,635 B1
(45) Date of Patent: Oct. 18, 2022

(54) SYSTEMS AND METHODS FOR CREATING AND PRESENTING VIRTUAL EVENTS

(71) Applicant: Hopin Ltd, London (GB)

(72) Inventor: Johnny Boufarhat, Barcelona (ES)

(73) Assignee: Hopin Ltd, London (GB)

( * ) Notice: Subject to any disclaimer, the term of this patent is extended or adjusted under 35 U.S.C. 154(b) by 0 days.

(21) Appl. No.: 17/559,351

(22) Filed: Dec. 22, 2021

(51) Int. Cl.
*G06T 19/00* (2011.01)
*G06F 3/04815* (2022.01)
*H04L 12/18* (2006.01)
*H04N 7/14* (2006.01)

(52) U.S. Cl.
CPC ........ *G06T 19/003* (2013.01); *G06F 3/04815* (2013.01); *H04L 12/1818* (2013.01); *H04L 12/1822* (2013.01); *H04L 12/1831* (2013.01); *H04L 12/1881* (2013.01); *H04N 7/141* (2013.01); *G06T 2219/024* (2013.01)

(58) Field of Classification Search
None
See application file for complete search history.

(56) References Cited

U.S. PATENT DOCUMENTS

| | | | | |
|---|---|---|---|---|
| 2014/0358632 | A1* | 12/2014 | Graff | H04L 51/36 705/7.29 |
| 2015/0304607 | A1* | 10/2015 | Bader-Natal | H04L 12/1813 348/14.08 |
| 2021/0342932 | A1* | 11/2021 | Koon | G06Q 50/01 |

* cited by examiner

*Primary Examiner* — Hemant S Patel
(74) *Attorney, Agent, or Firm* — Erise IP, P.A.

(57) ABSTRACT

Systems, programs, and media for creating virtual events and presenting the virtual event content to attendees of the virtual events are described herein. A virtual event hosting system may receive input from an event creator for creating an event comprising stages, sessions, networking, and expos. The event may provide a virtual environment for presenting users to make presentations and attendees to view and interact with the presenting users and other attendees. Data associated with the event and the attendees may be collected for analysis to improve engagement in future virtual events.

18 Claims, 13 Drawing Sheets

FIG. 6

SYSTEMS AND METHODS FOR CREATING AND PRESENTING VIRTUAL EVENTS

BACKGROUND

1. Field

Embodiments of the invention generally relate to a web-based platform for creating and hosting virtual events. More specifically, embodiments of the invention relate to systems and methods for creating and hosting virtual events and connecting presenting users with attendees of the virtual events.

2. Related Art

Traditionally, people attend conferences in person. The conferences may be provided at a location and promote education and networking within an industry. Presenting users provide presentations at the conference that people may attend in person. The conferences may provide stages for the presenting user to present, and sessions may follow the presentation allowing the attendees a chance to engage the presenters and other attendees. Furthermore, expos presenting and selling products may be constructed for quick and easy engagement with the attendees.

Typical conferences today present several problems. For example, these conferences are typically held at one or a limited number of locations. Furthermore, these conferences are typically held periodically, such as annually or bi-annually. For presenters and attendees to attend these events, the presenters and the attendees typically must travel long distances. The presenters and the attendees typically must buy plane tickets and spend several hours, if not several days, travelling to the conference. Traveling to just a single conference can be extremely expensive and time consuming.

What is needed is a virtual environment that facilitates the remote creation and presentation of events. Providing these events virtually can cut down on wasted time and wasted money by allowing the attendees, presenting users, and sponsors to conduct the event without having to travel all the way to the location of the event to present and attend in person.

SUMMARY

Embodiments of the invention address the above-described need by providing a virtual event hosting system that facilitates the interaction between presenters, attendees, and sponsors for education, networking, and product promotion. In some embodiments, the virtual event hosting system may provide virtual presentations or virtual stages for presenting users to present information and attendees to view the presentations. The attendees may also access sessions where the attendees may interact with presenters, other attendees, and content. The attendees may also set up networking engagements where attendees may interact with other attendees, presenters, or representatives of sponsors. Expos may also be constructed to promote sponsors' products, services, careers, and any other content. Furthermore, expos may also provide information about the presenting users, presentations, companies, education materials, in video, audio, and image form to attendees.

A first embodiment is directed to a method of creating a virtual event by an event organizer and presenting the virtual event to an event attendee, the method comprising the steps of: receiving, via a user interface and from the event organizer, creation of the virtual event, wherein the virtual event comprises stages, sessions, network connections, expos, and one or more presenters; receiving, via the user interface, registration creation information including ticket information for attending the virtual event; creating a stage supporting a presentation from a presenter of the one or more presenters to a plurality of attendees including the event attendee; creating a session supporting live interaction between the presenter and the plurality of attendees; creating the networking connections supporting interaction between the event attendee and the event attendee; creating an expo providing virtual booths comprising sponsor materials; receiving, from the event attendee, a registration for the virtual event; receiving, by the event attendee, a selection of the stage for viewing the presentation; presenting a video of the presentation in real time to the event attendee; receiving a selection of the session by the event attendee; connecting, by video, the event attendee with the presenter; receiving a selection of the network connections by the event attendee; receiving a selection of the expo by the event attendee; and presenting, to the event attendee, an expo video displaying information indicative of a company associated with the virtual event.

A second embodiment is directed to one or more non-transitory computer-readable media storing computer-executable instructions that, when executed by a processor, perform a method of creating a virtual event for presentation to attendees of the virtual event. The method comprises the steps of receiving, by a user interface and from a user, creation of the virtual event, wherein the virtual event comprises stages, sessions, network connections, expos, and one or more presenters, receiving, by the user interface, registration information including ticket information for attending the virtual event, creating a stage supporting a presentation from a presenter of the one or more presenters to a plurality of attendees, creating a session supporting live interaction between the presenter and the plurality of attendees, creating the network connections supporting interaction between a first attendee and a second attendee of the plurality of attendees, creating an expo providing virtual booths comprising expo videos, and presenting the virtual event to the plurality of attendees of the virtual event.

A third embodiment is directed to a system for presenting a virtual event for attendance by a user. The system comprises a processor, a data store, a display for presenting a graphical user interface to the user, and one or more non-transitory computer-readable media storing computer-executable instructions that, when executed by the processor, perform a method of presenting the virtual event. The method comprises the steps of receiving input from the user indicative of a registration for the virtual event, receiving, by the user, a selection of a stage for viewing a presentation, presenting a video of the presentation in real time to the user, receiving a selection of a session by the user, connecting the user with a presenter of the presentation by video in the session, connecting, by video, the user with an attendee of the virtual event, receiving a selection of an expo by the user, and presenting, to the user, an expo video displaying information indicative of a company associated with the presenter.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 6 depicts an embodiment of an attendee's page for tracking attendance of an event;

Figure 1:
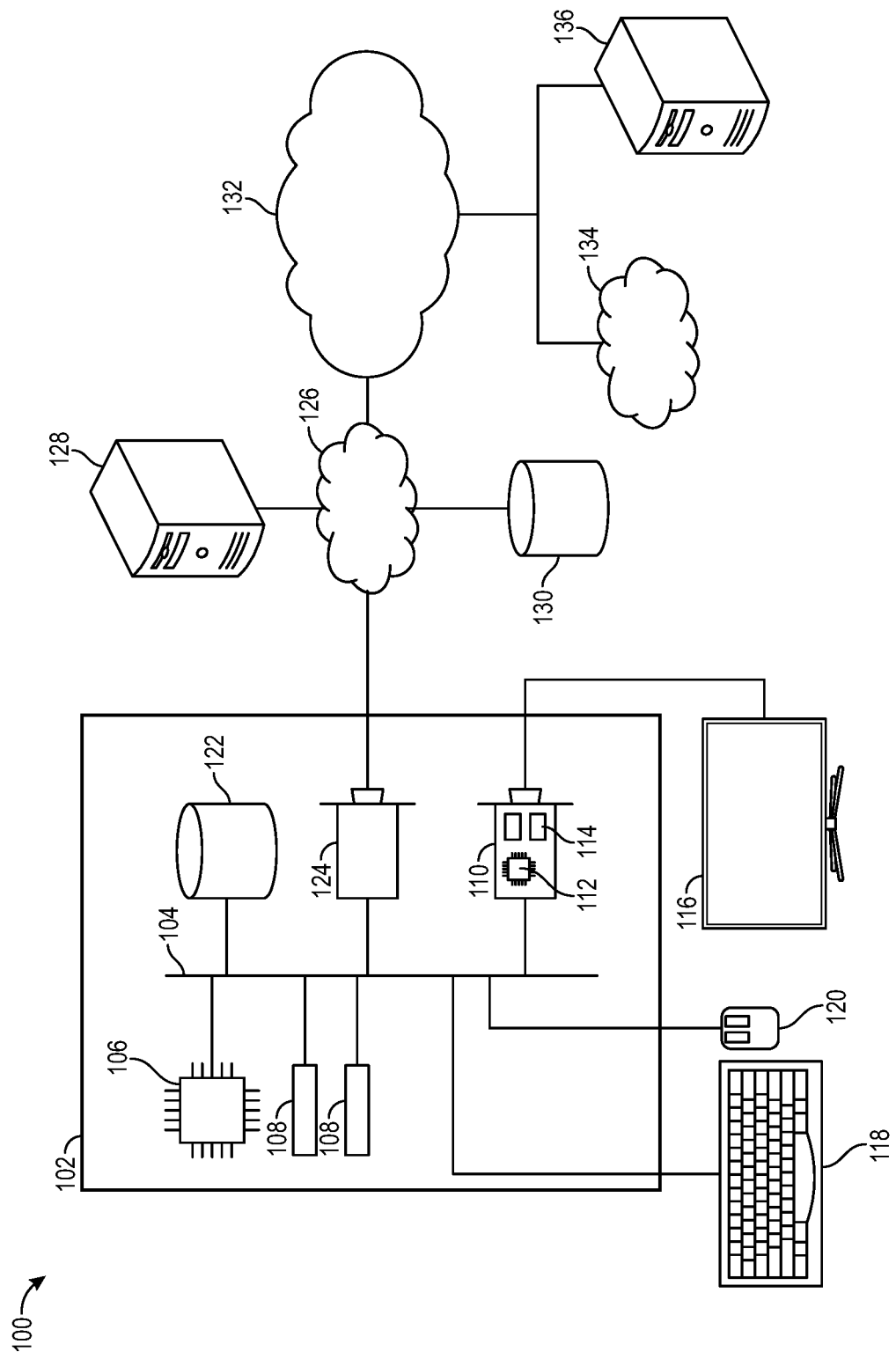
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the present teachings can be practiced. The embodiments are intended to describe aspects of the present teachings in sufficient detail to enable those skilled in the art to practice the invention(s) herein described. Other embodiments can be utilized, and changes can be made without departing from the claimed scope. The following detailed description is, therefore, not to be taken in a limiting sense. The scope of the claimed invention(s) is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, embodiments of the invention can include a variety of combinations and/or integrations of the embodiments described herein.

Generally, embodiments of the invention are directed to a virtual event hosting platform for providing virtual events connecting presenting users of the virtual event with attendees of the virtual events. The virtual event hosting system may be operable to receive input from the user scheduling and customizing an event for presenting users to present or perform to users that attend the event. In some embodiments, the user that creates the event may be referenced as the event creator (or the organizer) and the user that attends the event may be referenced herein as the attendee. The event creator may also be a presenting user and/or an attendee. In some embodiments, the organizer may also be a presenter at the event. Any user may attend, present, host, and create events.

In some embodiments, events comprise a plurality of communication connections between presenters and attendees. Events may comprise stages, sessions, networking engagements, virtual expos, and any other platforms for connecting presenters, sponsors, attendees, and any other user that has access to attend the event. In some embodiments, any user that has access to attend any part of an event may be generally referenced as an attendee. Stages may provide a virtual platform for presenters to present to an audience of attendees via a live (or time-shifted) broadcast. The attendees may attend the stage virtually via a user interface comprising a video display. The user interface may allow the attendee access to view the presentation live or recorded and chat with other attendees and the presenter by text, audible, and video communication.

In some embodiments, the event comprises one or more sessions. The sessions may allow attendees to communicate directly with a presenter via one or more video interfaces. An attendee may provide audio and video such that the presenter and other attendees may hear and see the attendee. Generally, the sessions may provide a virtual communication platform for providing question and answer sessions between the attendees and the presenting users.

In some embodiments, the event comprises networking opportunities. The network opportunities may provide time-limited communications between attendees at the events. The attendees may be connected to other attendees randomly or the connections may be pre-selected by an organizer or by the attendees. The attendees may connect by the video interface described in embodiments herein.

In some embodiments, the event includes one or more expos in which sponsors may promote products and services provided by the sponsors. The expos may be virtual booths for presenting information on exemplary topics such as company future expectations, products, services, and any other information that may be useful in traditional expo format. The expos may be provided by the user interface and may display any video, images, descriptions, and may include third-party application integrations for engagement by the attendees.

In some embodiments, the virtual event hosting system may track user interactions within the virtual event and integrate with applications of mobile devices to track user locations when the user is attending an event in person or virtually. The application may provide virtual event analytics to the event creator or organizer, data customer and data brokers, and offer customized scheduling to attendees based on a user profile and the user interactions to provide a customized user experience.

FIG. 1 illustrates an exemplary hardware platform 100 for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

In some embodiments, computer 102 may be generally referenced as a virtual event hosting system. The virtual event hosting system may be a web- or cloud-based application and may be provided on any computer device described in reference to computer 102 above. The virtual event hosting system may access other computer devices, sensors, and applications stored on other computing devices as well as peripheral devices. The virtual event hosting system may track user actions when interfacing with the virtual event hosting system and by accessing various applications associated with computer 102. In some embodiments, any data tracking and access may be customized by the user.

Creating an Event

Figure 2:
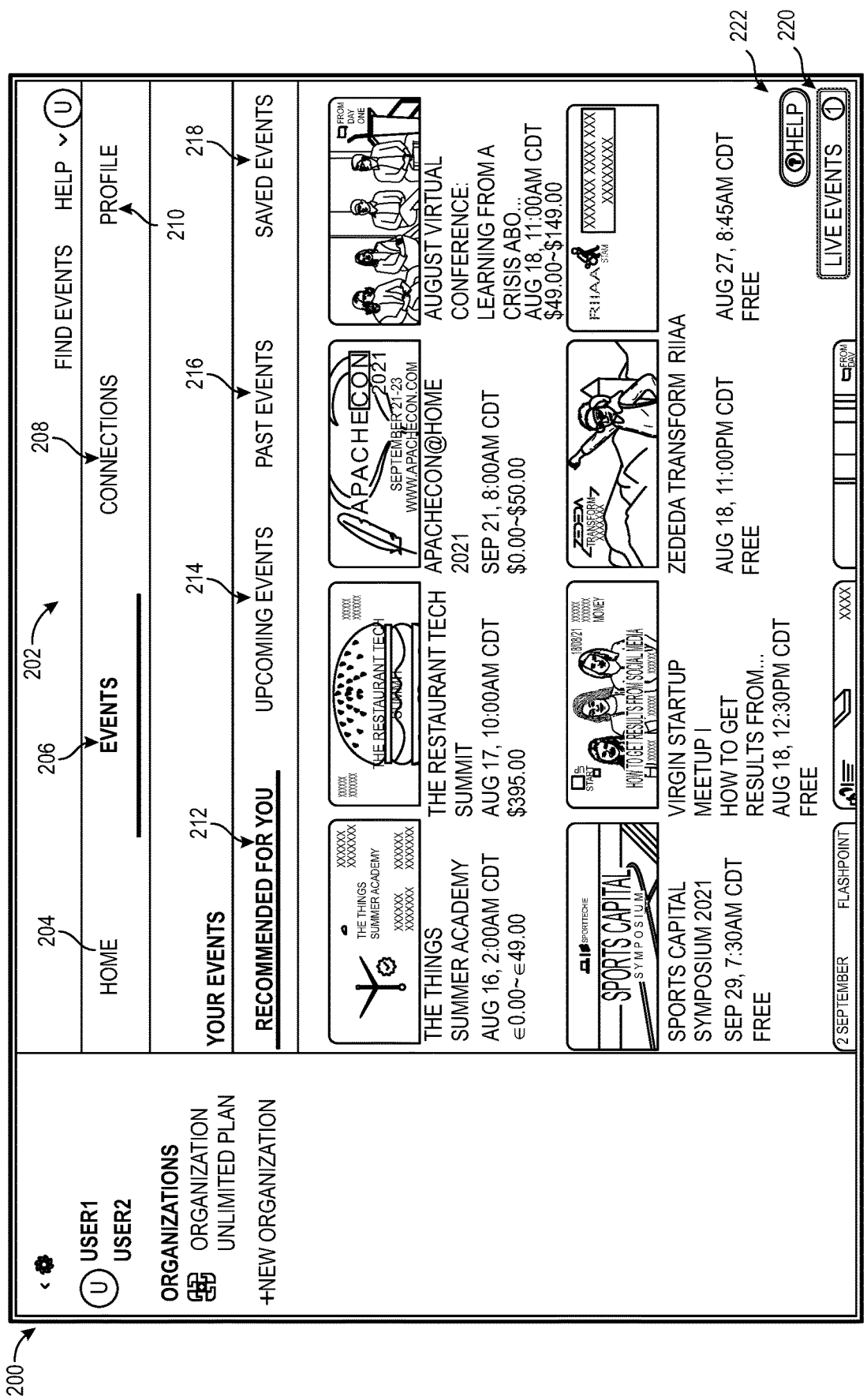
FIG. 2 depicts an embodiment of a user welcome page presented by a virtual event hosting system.

FIG. 2 illustrates an exemplary embodiment of a discovery page 200 with events tab 206 selected. In some embodiments, discovery page 200 may comprise user selection menu 202 comprising home tab 204, events tab 206, connections tab 208, and profile tab 210. The user page may be displayed to the user when the user is logged into the virtual event hosting platform. The displayed user page corresponds to attending user User1. Discovery page 200 may display upcoming events to which the attending user is registered. The attending user may select the upcoming events and view scheduling information for the upcoming events. In some embodiments, a set of most recent networking opportunities may be presented in discovery page 200. The networking connections may be presenting users and attendees of events, and the presenting users and attendees' names and contact information may be presented.

In some embodiments, discovery page 200 may present events tab 206. Events tab 206 may present recommended events 212, upcoming events 214, past events 216, and saved events 218. Recommended events 212 may be a list of events that are recommended to the user. The events may be recommended to the user by analyzing upcoming events 214, past events 216, saved events 218, the user profile, user click throughs, events that the user has viewed but not clicked, length of time viewing events, third-party data obtained from search engines, social media sites, and any other data that may be obtained to predict events that the user may be interested in.

In some embodiments, upcoming events 214, past events 216, and saved events 218 may be presented to the user. As described above, upcoming events 214 may be events for which the user is registered. Past events 216 may be events that the user has already attended. Saved events 218 may be events that the user has saved for later viewing and consideration.

In some embodiments, live events button 220 may be presented by the discovery page 200. Live events button 220 may be selected to display events that are currently taking place that also have available open registrations. The user may select live events button 220 to view any live events from any page. In some embodiments, help button 222 may be selected to access a menu of help topics or directly contact a virtual event system representative.

In some embodiments, connections tab 208 may be presented to the user. Under the connections tab, network connections may be presented to the user. The network connections may provide name, contact information, and links to contact the connected people. The connected people may be presenting users and other attendees of events. The connected people may be users that are connected through the events, or, in some embodiments, the virtual event hosting system may match the people to the user based on analyzed profile and event data as described above.

In some embodiments, profile tab 210 is presented by the virtual event hosting system of the discovery page 200. The profile tab 210, when selected, may present user information that may be updated and saved by the user. The user information may be any personal information such as, for example, name, username, password, biometric log-in information, contact information, as well as likes, dislikes, interests, and any other information that may be useful for virtual event analytics. In some embodiments, profile information may also comprise any historical data recorded from events and interactions with the virtual event hosting system and stored third-party data as described above.

Figure 3:
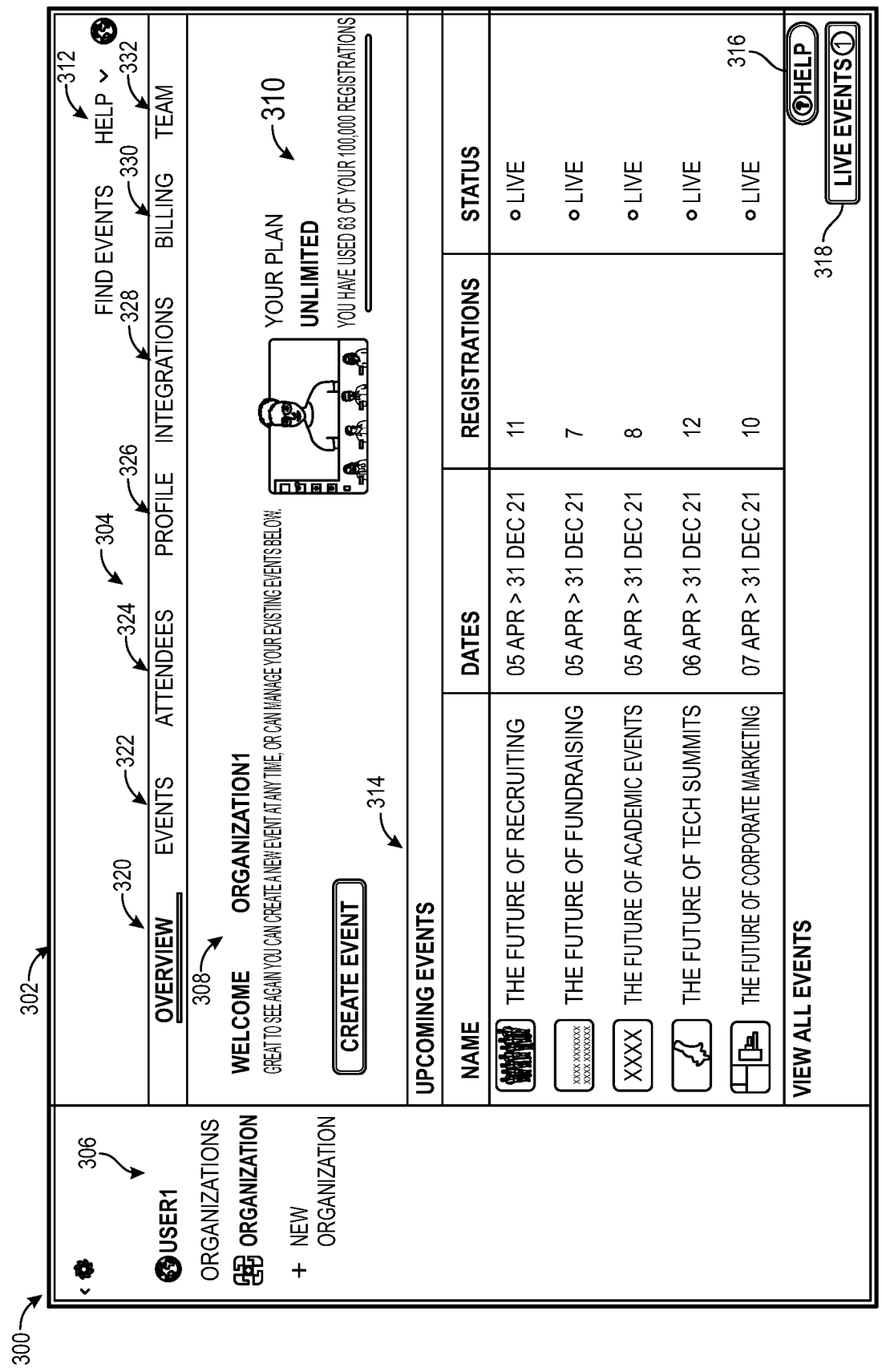
FIG. 3 depicts an embodiment of an organization page presented by the virtual event hosting system.

FIG. 3 illustrates an exemplary welcome page 302 to the user generated by the virtual event hosting system described in FIG. 1 above by the exemplary user interface 300. In some embodiments, the welcome page 302 presents top menu 304, side menu 306, welcome banner 308, plan description 310, help bar 312, upcoming events field 314, help button 316, and a live events button 318. In some embodiments, top menu 304 comprises selectable category tabs such as overview tab 320, events tab 322, attendees tab 324, profile tab 326, integrations tab 328, billing tab 330, and team tab 332. Each category of top menu 304 is discussed in detail below.

In some embodiments, side menu 306 displays a username and an organization of which the user is a member. The organization may be any group that may associate users such that all members of the organization have a minimum access level to settings and events. As such, each member of the organization may view similar content and share content with other members. As shown, welcome banner 308 states "Welcome Organization1." As such, welcome banner 308 may be presented to each member of the organization upon opening welcome page 302. In some embodiments, the user may be a sole user and may not be associated with an organization. Embodiments, described herein may relate to any organization or any sole user.

In some embodiments, the organization to which the user is a member may have a profile and a plan. Plan description 310 may display the type of plan associated with the organization and/or the user. The types of plans may include individual, business, organization, as well as limited and unlimited plans. Each plan may serve various numbers of people as well as allow various numbers of attendees to create events. The various plans may also cost various monetary amounts depending on the level of access to events and a number of users included in the plan.

In some embodiments, overview tab 320 displayed on top menu 304 provides the welcome banner 308 for the organization to which the user is a member. The organization may include a plurality of members and may be any group, company, or individual. In some embodiments, there is no organization, and the user may simply log in, create events, and attend events depending on the plan type. Overview tab 320 further presents upcoming events field 314 such that the user may view and select an upcoming event. Upcoming events may have attributes including, for example, dates of events, number of people registered for events, and a status of events which indicates if the event is live or upcoming and if the event is open or restricted. When the attendee user selects an upcoming event, the user may be directed to a registration page that displays a text, picture, and video description and a selection to register for the event. The registration page is described in more detail below.

In some embodiments, when events tab 322 is selected, a list of events recommended for the user may be displayed. The list of events may include popular events or a list customized for the user based on the user profile, user interactions within the virtual event hosting system, and/or location and tracking data for the user at a live event. The displayed recommended events may be determined based on any data associated with the user including historical interaction data, profile data, and data collected from third-party applications and websites.

In some embodiments, when the user selects attendees tab 324, a list of attendees across all events organized by the user may be provided. The user may select attendee names from the list and edit the list. The user may select names and contact information may be displayed as well as input fields to send messages or emails, or call the attendees. In some embodiments, contact information and location information may be displayed along with the attendee identification information.

In some embodiments, when the user selects profile tab 326, a profile of the organization and/or user is displayed and may be edited. The profile may comprise any information associated with the user or the organization. The profile may include the user's name, contact information, log in information, as well as event preferences and event attendance history. The virtual event hosting system may store data associated with the user and user's data for later analysis. The profile may also include plan information and event access information.

In some embodiments, the user may select integrations tab 328. A list of integrations that may be accessible by the user may be displayed. The integrations list may include any applications that may be approved for running on the virtual event hosting system or applications from which the virtual event hosting system may provide or obtain data. The applications may include social networking, gaming, financial, data management, screensharing, or any other applications that may be useful to and desirable by event creators, event hosts, and event attendees. Organizers may access integrations tab 328 to access integrations as well as request and build integrations with the virtual event hosting platform. The integrations are discussed in more detail below.

In some embodiments, billing tab 330 may be selected and the billing details of the account associated with the user and/or the organization may be managed. The user may have various levels of virtual event hosting system plan membership such as (for example) base plan, mid-level plan, and premium plan. In some embodiments, some account levels may be free and include limited features. For example, the base plan may be free and include free access and free creation of events with up to 50 members. Furthermore, the base plan may have limited virtual event analytics. In contrast, the premium plan may be the most expensive and include unlimited members and events including unlimited attendees to stages, sessions, networking, and expos, and provide access to all possible virtual event analytics. The accounts and plans associated with the user and/or the organization may be managed under the billing tab.

In some embodiments, under team tab 332, a list of members and contact information for the organizer organization may be displayed and edited. The list of members may comprise contact information for members of the organization. The team members may be added and removed and contact information may be edited under team tab 332.

Figure 4:
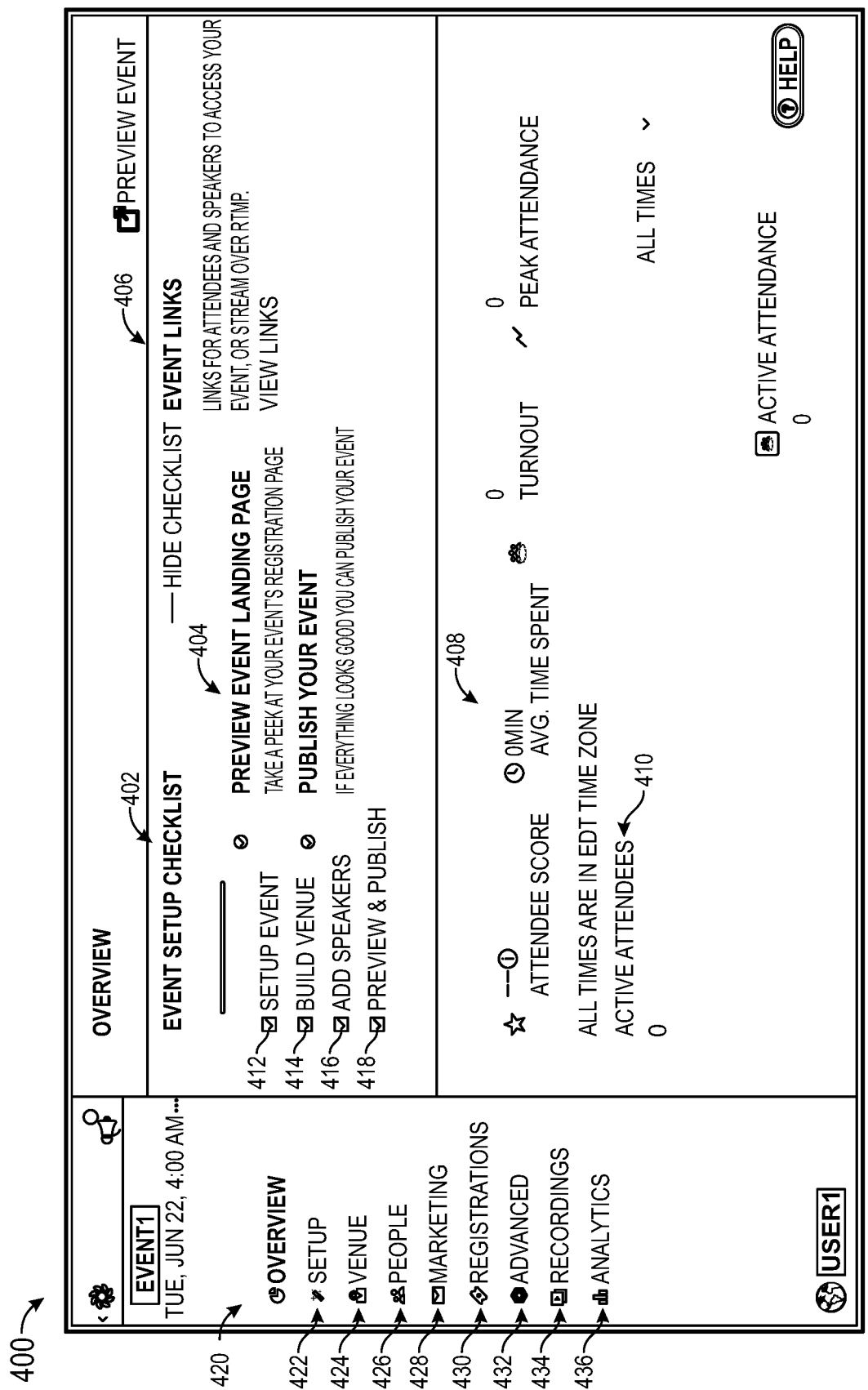
FIG. 4 depicts an embodiment of an event creation overview page.

FIG. 4 illustrates an exemplary event creation overview page 400. The event creation overview page 400 may be accessed by selecting an event creation button that may be provided under events tab 322 or any of the tabs of the welcome page 302 in FIG. 3. The event creation overview page 400 may also be presented by receiving a selection of the organizer organization name presented in FIG. 3. In some embodiments, intermediate pages may be displayed for naming the event, setting a schedule to publish the event, and listing viewability of the event. When the event is named and scheduled the event may be created, and the event creation overview page 400 may be presented.

In some embodiments, event creation overview page 400 comprises event setup checklist 402, links to preview and publish the event 404, event links 406, virtual event analytics bar 408, and active attendees 410 which, in some embodiments, may be registrations including registration demographics and number of registrations. Creation of events may be managed from the event creation overview page 400; however, more detailed creation may be provided at the event creation menu 420 which is discussed in detail below.

In some embodiments, event setup checklist 402 may provide a quick list of items that the user may complete to create the event. The items on the event setup checklist 402 may be, for example, set up event 412, build venue 414, add presenting users 416, and preview and publish 418. Any number of items may be added to the list and may be customizable by the user. As the user completes the items on the list, indications of completion of each event item may be shown. Furthermore, event setup checklist 402 may display a number of, or a percentage of, the event creation items completed.

The exemplary event creation overview page 400 may comprise links to other pages of the user interface that may be accessible by preview and publish the event 404 and event links 406. For example, links to keep track of event details, create and track registration and tickets, create an events landing page, and any other links that may be useful and customizable by the user may be included on the event creation overview page 400.

The exemplary event creation overview page 400 may also present event creation menu 420 for creating the event creation items on the event setup checklist 402. For example, input may be received at setup tab 422 to set up a virtual venue or a live venue for the event and provide links to view the event at the venue. Furthermore, a theme for the virtual event may be created. The user may edit the name, schedule, and details of the event. The details of the event may comprise items such as, for example, stages for the presenting users and if and how the stages are displayed virtually. In some embodiments, buttons may be presented to turn on items and provide links to pages presenting items such as stage, networking, replay, session, and expo. Each item may have a corresponding tab in the event creation menu 420 and are described in more detail below.

Furthermore, under the setup tab 422, a theme for the event may be created. A theme may comprise a list of various colors that may be selected for use in the event pages and marketing of the event. The user may select colors that correspond to the company's brand. In some embodiments, when the user selects a color palette for the theme, templates for the event landing pages and marketing may be updated with the event colors. In some embodiments, users may create banners and promotional pages to upload for the event pages and promotions and the colors may be selected to coordinate with the uploaded colors.

Figure 5:
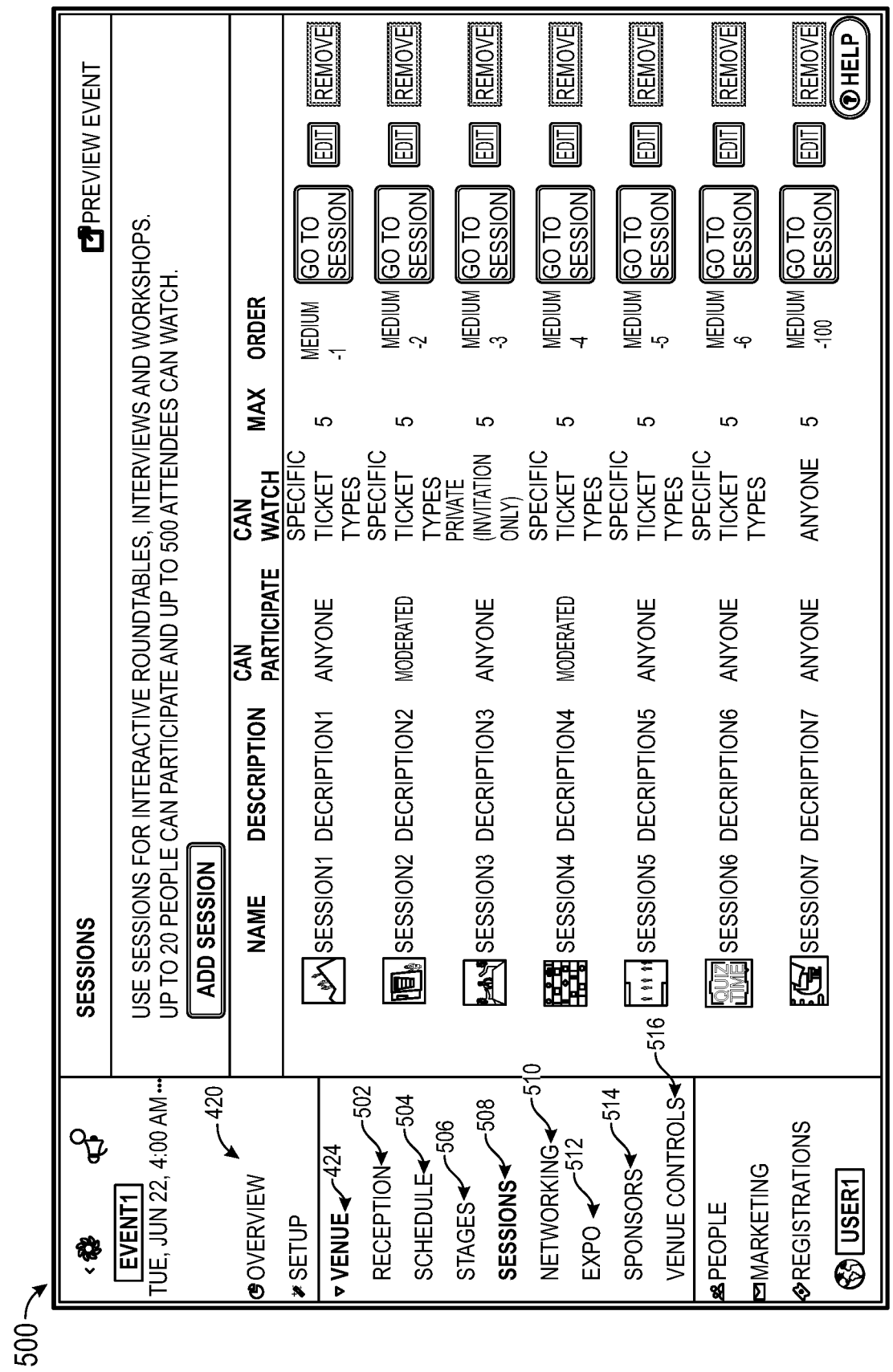
FIG. 5 depicts an embodiment of a sessions editing page for editing parameters of sessions.

In some embodiments, following the setup tab may be a venue tab 424 depicted in FIG. 5. The venue tab 424 may further provide a menu comprising various options such as reception tab 502, schedule tab 504, stages tab 506, sessions tab 508, networking tab 510, expo tab 512, sponsors tab 514, and venue controls tab 516. FIG. 5 presents an exemplary sessions page 500 presented when receipt of selection of venue tab 424 and sessions tab 508 are selected.

In some embodiments, when reception tab 502 is selected, the virtual event hosting system may present input fields for receiving a welcome message. The user may input the welcome message for attendees to view upon registration and upon entrance into the live or virtual event. Furthermore, sponsors and integrations may be input by the user such that the user may communicate and provide sponsor deals for the attendees upon registration and attending the event. The integrations may be any software that may be used within the virtual event hosting system. For example, the user may send the welcome message and sponsorship deals via a social media platform such as, for example, TWITTER™ or FACEBOOK™.

When the user selects schedule tab 504, a calendar (not shown) may be displayed. The calendar may be displayed by year, month, week, and day such that users may input the sessions to be at particular times. Users may also schedule any promotions, stages, expos, networking, and any other items for the event. In some embodiments, the virtual event hosting system may connect with or facilitate interaction with interactions such as GOOGLE™ Calendars, MICROSOFT™ Calendars, and any other calendars that may be integrated into the virtual event hosting system. In some embodiments, the user's personal calendar may be integrated and accessible in the virtual event hosting system. In some embodiments, the virtual event hosting system may push data to an externally stored calendar which may display the schedule information.

Under stages tab 506, the user may select and define a stage for presentations by presenting users presented as live feeds. The stages may be virtual stages for presenting user presentations that are presented visually and are described in detail below. Under stages tab 506, the user may create stages, create, and edit the name of the stages, provide a description of the presentation at the stages, define who can participate and has access to the stages, who and how attendees can watch the feeds of the stages, maximum numbers of attendees for attendance at the stages, and types of tickets that are acceptable for the stages.

In some embodiments, sessions tab 508 may be accessed by the event creation menu 420. FIG. 5 depicts exemplary sessions page 500. When sessions tab 508 is selected by the user, the sessions list may be presented to the user as shown in FIG. 5. In some embodiments, stages tab 506, networking tab 510, and expo tab 512 may be set up for the user to create and edit in a similar way. In some embodiments, sessions may be virtual presentations where attendees may interact with other attendees and the presenting users of the event. The sessions may comprise two-way open communication between attendees and presenting users. In some embodiments, the event may comprise a plurality of presenting users at a plurality of sessions and attendees may be scheduled to attend the plurality of session on location or virtually. In some embodiments, the sessions may only be virtual and may be provided through the virtual event hosting system allowing access to the presenting users and the registered attendees. The user may create various sessions with promotional images, descriptions, registration restrictions, orders, and the user may be allowed to add and remove sessions. Any number of sessions may be set up for virtual or live events and may be recorded and edited for future viewing by attendees that register to view the events in the future or by attendees during the event.

In some embodiments, the event creation menu 420 may present networking tab 510. Networking tab 510 may provide creation and editing of user networking connections. Networking connections may be created to link attendees with presenting users, presenting users with other presenting users, and attendees with other attendees. The networking connections may be created by the user or may automatically be created by the virtual event hosting system based on the user profile and past event interactions of the user. The networking connections may be presented to attendees and presenting users and is discussed in more detail below. In some embodiments, the attendees may create networking connections as described below.

In some embodiments, when the user selects expo tab 512, the user may be presented with options to create and edit expos comprising booths. The booths may be live and/or virtual and may be presented to registered attendees of the event or publicly to any attendees as decided by the user. The booths may comprise any video, images, text, sponsorships and app integrations, and be presented to the attendees via the virtual event hosting system. The booths may be prioritized by predicted importance by the user such that it may be listed in a custom prioritized order. The booth owner may input any booth owner or presenter information for contact by the attendees. Furthermore, any images, videos, or promotional content from the user or booth owner/presenter may be uploaded for presentation at the booth in the expo. The booth owner may present or otherwise integrate with social media, documents, and any other presentations through any integrations as described above. The expos are described in more detail below.

Virtual event sponsors may be added and edited by an organizer through sponsors tab 514. Sponsors may be any company, organization, or individual approved by the virtual event organizer. Sponsors may upload any images, videos, descriptions, and any other content related to the sponsorship for the expos and any other stages, sessions, network connections, and any pages and interactions provided by the virtual event hosting system.

In some embodiments, venue controls tab 516 may be selected to provide controls for the organizer or presenter to present to attendees at the events. The user may control a plurality of interface activities at the event which may be provided by an activity panel. The interface activities may be chat panels, polls, and question and answer sessions with the presenting users and other attendees. The interface activities may be set to on or off or customized by the user for each event, stage, session, expo, and any page provided by the virtual event hosting system. The user may control any information that attendees see, such as, for example, information about other attendees, presenting users, upcoming events or upcoming sessions within events, user access, and interactions that are available to the presenting users and attendees. Furthermore, the user may allow networking between attendees and presenting users as well as allowing attendees to create their own sessions within an event by venue controls tab 516.

In some embodiments, the user may gamify the events by providing incentives for attending stages, sessions, expos, and completing stages, sessions, and expos as well as creating their own sessions, completing polls and surveys, and/or interacting with any expos or other interactive tools at events. As part of the gamification, attendees may accrue credits for participating in certain ways such as, for example, participating in sessions, attending expo booths, and participating in network opportunities with attendees or presenters who have expressed interest in networking with the attendees. Any accrued credits received for completing the activities above may be redeemed for networking access to presenters or other attendees, reduced cost on attending events, and any other benefit that may be provided to the attendee.

In some embodiments, the organizer may set up a guided event for attendees. In some other embodiments, a guided event may be customized for particular attendees based on machine learning methods, whereby a neural network is applied to attributes of an attendee and content associated with the virtual event to customize a virtual event experience for the attendees. Such a guided event may be based on information that the attendee provides during registration and/or based on a profile of the attendee. The guided event may create a schedule and/or provide alerts to the attendee as to particular sessions and expos that may be of interest to the attendee in addition to sessions to which the attendee has expressed interest. In some embodiments, the virtual event hosting system automatically generates a guided event for attendees using the above machine learning mechanisms, and the attendees may opt in or opt out of the guided events. A guided event may update throughout the course of the event as the attendee's interactions with the event are accumulated. The virtual event hosting system may further recommend replays of the event based on the user's actions and interactions after the event.

Figure 6:
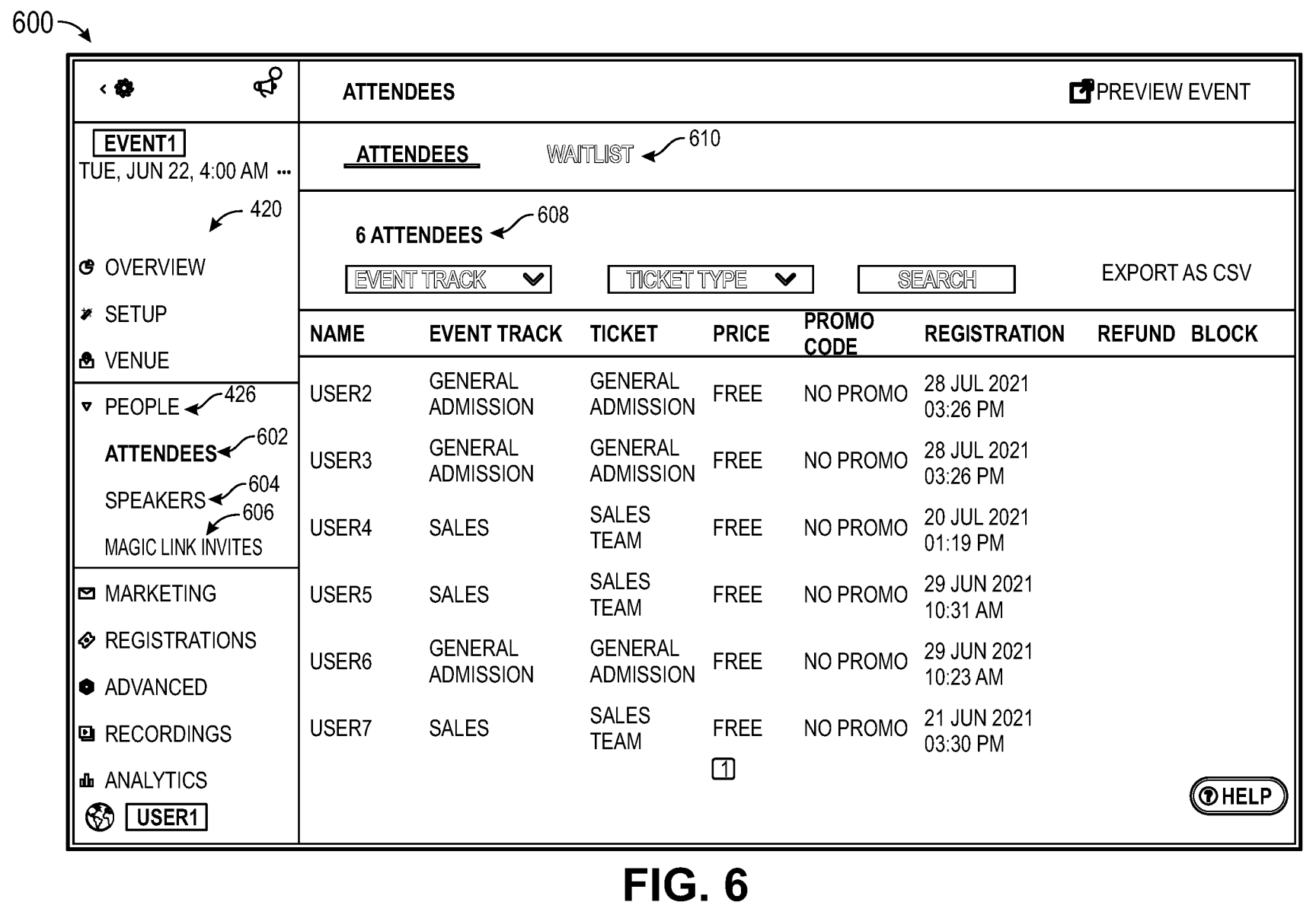

Turning to FIG. 6, the next tab on event creation menu 420 may be people tab 426. People tab 426 may provide a plurality of subcategories via a dropdown menu for the user to manage people, such as attendees and presenters. The attending, presenting, or organizing user may also manage interactions between people under people tab 426 in the pages generated.

FIG. 6 illustrates an exemplary attendee page 600 for tracking attendees of the event under the people tab 426. In some embodiments, event creation menu 420 comprises attendees tab 602, presenting user tab 604, and magic links invites tab 606. On attendee page 600, the user may be presented, for each user and by the virtual event hosting system, attendee list 608 including attendee names, event tracks, ticket types, ticket prices, promotions associated with each user, registration dates, and options to refund the user and/or block the user. The user may edit any information on the list that may be integrated across other pages in the event creation user interface including attendee page 600. In some embodiments, waitlist 610 is also available comprising attendees that have registered for a full event and are waiting for a spot to open if an attendee cancels or is otherwise unable to attend. Attendee list 608 may be available for output for printing or transmitting as, for example, a csv file; however, any document format may be used.

In some embodiments, presenting user tab 604 may be selected to add, delete, and manage presenting users. When selected, presenting user tab 604 may generate or create a presenting user page where the user may input presenting user information associated with the presenting user such as, for example, name, credentials, education, curriculum vitae (CV), and associated event and session information where the presenting user may be presenting. Any presenting user parameters may be edited under the speak tab.

Magic link invites tab 606, in some embodiments, comprises inputs for inviting attendees, linking personal documents, and providing links to the attendees such that the attendees can instantly attend the events. In some embodiments, attendee and presenting user documents may be uploaded. For example, CV or other documents may be uploaded for other attendees and presenting users to view. Furthermore, the user may invite individuals or a plurality of potential attendees simultaneously by inputting contact information and sending a single, or personalized, message to the potential attendees. The attendees may receive a link to the associated event such that the attendees may select the link and automatically be transferred to a landing page of the event.

Referring to FIG. 4, the next tab on the event creation menu 420 may be marketing tab 428. Under marketing tab 428, the user may set up marketing emails and social media notifications to alert customers of upcoming events and added stages, sessions, expos, and any other interactions associated with events. In some embodiments, mass emails may be sent using third-party applications. In some embodiments, notifications, such as emails, may be set up to send to attendees and presenting users when triggering events occur. For example, emails providing changing information may be sent such as, session time change, timed reminders of sessions, registration notification, magic link invites, and any other automatic notifications that may be beneficial to attendees and presenting users may be stored and sent under marketing tab 428.

The next tab on the event creation menu 420 may be registrations tab 430. Under registrations tab 430, users may set up registrations for events including sessions, expos, networking engagements, and any other registrations for events. Users may define the number and types of tickets to be sold.

Figure 7:
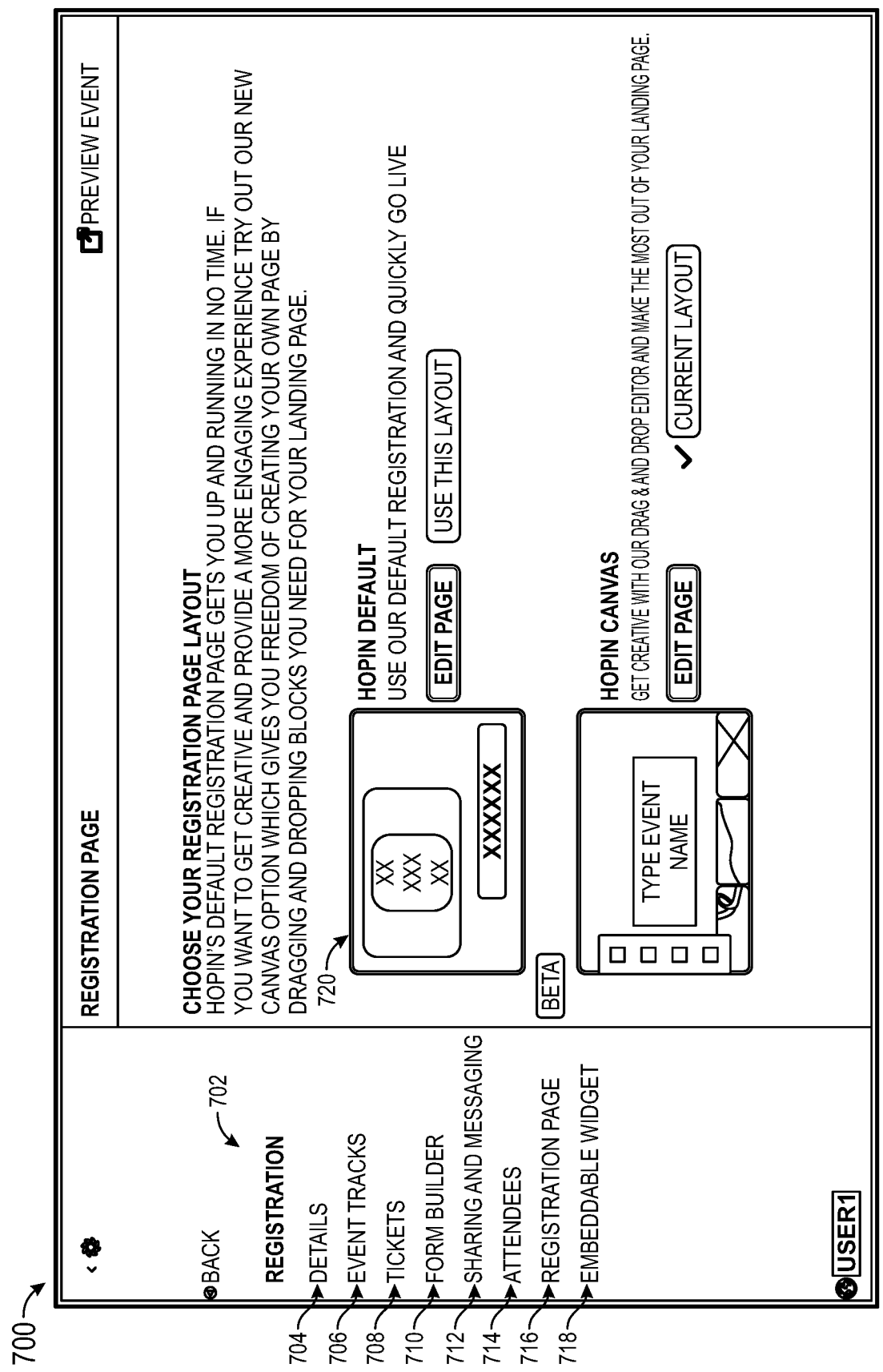
FIG. 7 depicts an embodiment of a registration page for managing event registrations.

FIG. 7 illustrates an exemplary registration page 700 comprising registration menu 702 including details 704, event tickets 706, tickets 708, form builder 710, sharing and messaging 712, attendees 714, registration page 716, and embeddable widgets 718. The user may define and customize the layout of the event registration page. In some embodiments, event registration page templates 720 may be provided and the user may select a template layout to present to prospective attendees. In some embodiments, the event registration page may be similar to the event landing page (event registration page 1000) illustrated in FIG. 10 and described in detail below. In some embodiments, any items on the event registration page 1000 such as, for example, headers, sections, presenting users, schedules, sponsors, expos, and media may be accessed and edited at the registration page 700.

In some embodiments, event tracks can be created for each event. Event tracks may define what types of tickets can be purchased and what the ticket types may be used for. For example, a premium ticket may allow an attendee to attend all sessions while a regular ticket type may allow an attendee to attend events except the main presenter. Furthermore, a VIP ticket may allow an attendee to meet the main presenter. In some embodiments, the user may track registration and attendance using Urchin Tracking Module (UTM) codes. The user may view and manage registration virtual event analytics at the registrations tab. In some embodiments, the user may also access attendee list 608 and edit any registrations associated with the attendees either under registration tab 430 or people tab 426. In some embodiments, registration widgets may be used to host registration on third-party websites. Any of the above-described functionality may be accessed on the third-party website by the widgets.

Referring back to FIG. 4, the next tab on the event creation menu 420 may be advanced tab 432. Under advanced tab 432, the user may have access to various settings within the events system. In some embodiments, the virtual event hosting system may track registrations and a source from which a user registered for the event. For example, an attendee may register from a third-party website such as a social media site. In this case, a referral is stored such that the user may be notified of the registration and so that the social media page may be compensated a percentage of the registration cost. In this way, users may promote events and obtain registrations through third-party sites. Management of the third-party registrations may be provided by selecting advanced tab 432.

Furthermore, the user may be able to customize text. The user may customize any text that may be presented to the presenting users and attendees including labels and links. The text that may be customized may be included in the booths, chats, expos, networking, people, polls, and any other text and labels that may be presented to attendees and presenting users. Furthermore, marketing may be included under advanced tab 432 and may provide any functionality as described on marketing tab 428 above.

Continuing with the advanced settings, in some embodiments, the user may input any host information that may be displayed to attendees and presenting users and may be displayed on a ticket type basis. For example, a VIP ticket may view host contact information such that the VIP user may contact the host while a regular ticket attendee may only view the host name and relevant credentials. Any host information may be input or uploaded such as, for example, images, videos, contact information and links as well as links to social media accounts may be added.

The next tab in the event creation menu 420 may be recordings tab 434. In some embodiments, the virtual event hosting system may provide replays. Replays may be created under recordings tab 434 or under setup tab 422 which may provide a link to recordings tab 434. In some embodiments, presentations from presenting users that are presented during the events may be recorded and presented for view in the future as replays. In some embodiments, stages, sessions, and expos for an event may take place simultaneously, and the replay for the stages, sessions, and expos may be available for view by attendees of the event during the event or after the event. In some embodiments, users may register specifically for replays when events have concluded.

Figure 8:
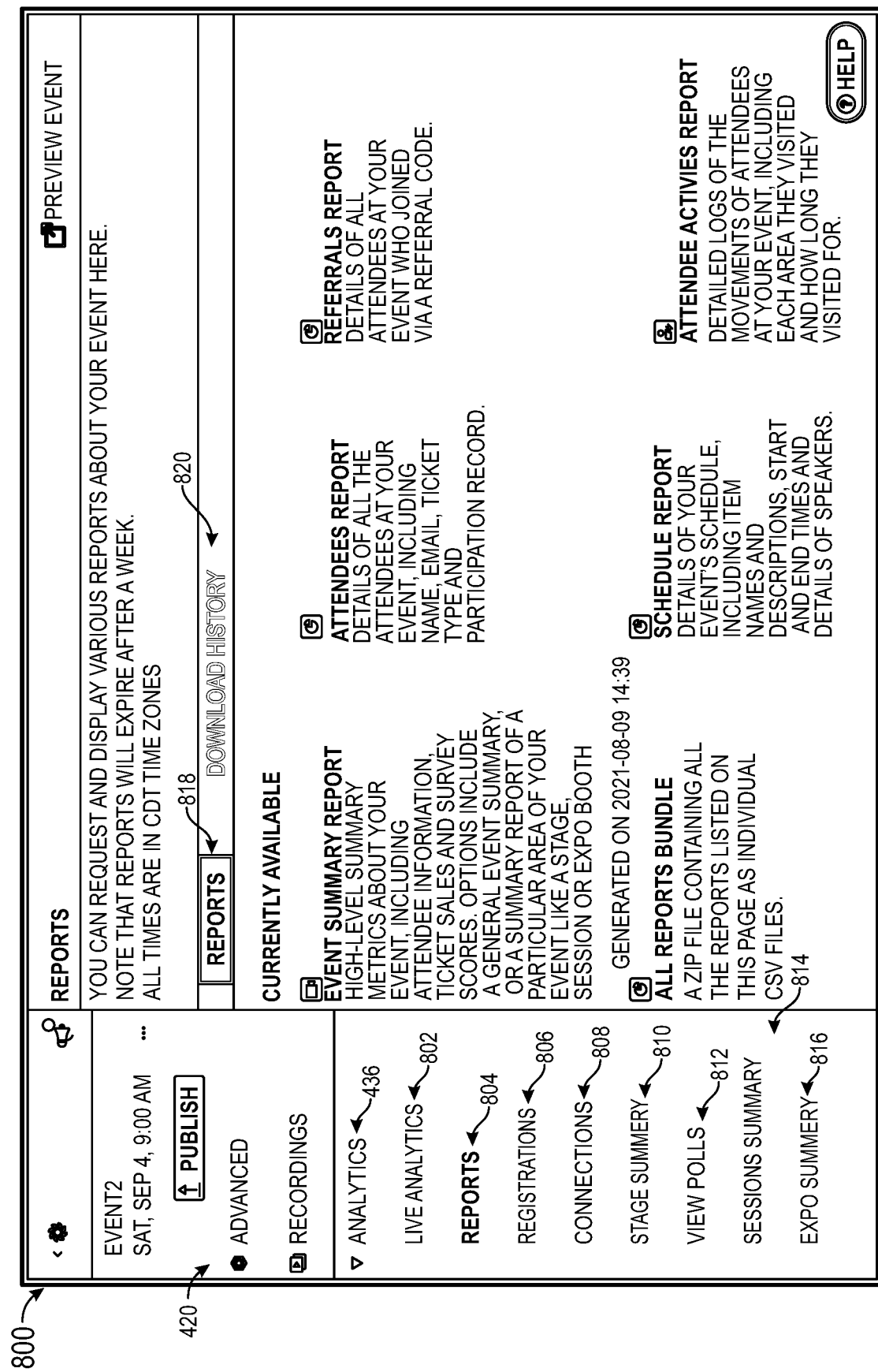
FIG. 8 depicts an embodiment of a reports page for selecting virtual event analytics reports.

The next tab on the event creation menu 420 may be virtual event analytics tab 436. Under virtual event analytics tab 436, the user may have access to various virtual event analytics and data associated with events presented by the events system. Exemplary virtual event analytics reports page 800 is depicted in FIG. 8. Under virtual event analytics tab 436, several sub-tabs such as, for example, live virtual event analytics 802, reports 804, virtual event analytics registrations 806, virtual event analytics connections 808, stage summary 810, view polls 812, session summaries 814, expo summaries 816, and any other selections that may display virtual event analytics associated with any presentations, presenting users, and attendees of the events system may be presented. The virtual event analytics may track and provide statistics for any event or user associated with the events system as well as virtual event analytics associated with any stage, session, networking, expo, or any other interactions associated with the event.

In some embodiments, live virtual event analytics 802 may be determined and provided to the user. Live virtual event analytics 802 may present active users of the events system associated with the event of the user. The active users may represent any in-person attendee and/or any virtual attendee or presenting user. Furthermore, live virtual event analytics 802 may track the users in real time and provide virtual location information (e.g., sessions, expos, and events) as well as an amount of time spent at the virtual locations. Furthermore, live virtual event analytics 802 may provide previous location information and previous time information for attendees. Any virtual event analytics data may be displayed in tabulated and/or graphic form for simplicity for the user.

FIG. 8 illustrates the exemplary virtual event analytics reports page 800 for accessing reports 818 of the event. The reports 818 may provide any data virtual event analytics report for any data that may be gathered in association with events including expos, sessions, networks, as well as any user-specific virtual event analytics such as, for example, attended sessions, events, and expos. Furthermore, virtual event analytics may be provided for time spent at sessions, expos, booths, networking engagement, polls completed, awards gained, and any other interactions by attendees and presenting users. In general, reports 818 may cover any recordable interactions users may have with the events system and determine average numbers of attendees at specific times and attendee flow rates and trends for the events. The user may select a report of the reports 818 and the data associated with the selected report may be processed and presented to the user. The data may be presented in any graphical form including line, trend line, bar, pie, and any other type of presentable graph that may make the data easily viewable.

In some embodiments, download history 820 may be accessed that provides a list of downloads by the user. The user may download reports in various formats for publishing, presenting, and the like. The user may download any reports discussed herein and a history of the downloads may be stored such that the user may view and access the downloads at a later date.

Virtual event analytics registrations 806 may provide virtual event analytics associated with registrations. The virtual event analytics related to registrations may be based on events, for example, number of registrations, time of registrations, countries of registrations, number and types of tickets sold, and any other statistics that may be calculated based on the data saved for registrations for events, stages, sessions, networking, and expos may be processed.

Virtual event analytics connections 808 may provide virtual event analytics associated with various network connections made during the event. Attendees and presenters may connect to swap ideas during the event as described above. The connections may be stored and analyzed to determine which sessions gain the most attendees, the most interactions, the most connections, and the like. Virtual event analytics connections 808 may provide insight into the interactions and engagement at particular events.

In some embodiments, stage summary 810 allows users to download reports presenting event virtual event analytics associated with stages. In some embodiments, the downloaded reports may be the reports provided by reports 818. In some embodiments, users may present reports to attendees and presenters. In some embodiments, the user may download and view a stage summary report. The stage summary report may present any data associated with a particular selected stage. For example, the user may select a particular stage to analyze. The stage summary report may provide stage information such as, for example, live stage event, in-person stage event, virtual stage event, pre-recorded stage event, sessions at the stage, presenters at the stage, schedule of the stage event, and any other information associated with the stage. In some embodiments, the stage summary report may provide some or all virtual event analytics for the stage such as, for example, number of presenters, number of registrations, number of attendees, length of attendance per attendee, average length of attendance, and any other data virtual event analytics that may be recorded and reported to user.

In some embodiments, the stage summary 810 may provide options for viewing and downloading network connections and communications associated with the stage events. Any network connections and electronic communications provided on the virtual event hosting system may be viewable by the user. In some embodiments, attendees and presenters may elect in or elect out of providing electronic communications.

Furthermore, access to poll results may be provided under virtual event analytics tab 436. View polls 812 may provide the user results from polls associated with the event. The user may provide polls to attendees and presenters, and the polls may be provided to users under view polls 812. In some embodiments, the polls may be standard polls for attendees to complete, and the poll results may be presented to the user. Standard poll questions may be, for example, "Did you find the presentation educational?" "Will you research the presentation topic further?" "Would you recommend this presentation to a friend or colleague?" In some embodiments, users may provide custom questions for the polls as well. Polls and surveys may be provided at any point during the events.

In some embodiments, session summaries 814 may be recorded videos of the sessions as well as documents containing notes for the sessions and topics covered. Session summaries 814 may provide virtual event analytics related to the sessions such as, number of attendees, time span attended, engagement, and any other virtual event analytics that may be recorded during the sessions. The session summaries 814 may be provided to the user and downloadable in reports 804.

In some embodiments, expo summaries 816 may provide data detailing a particular expo or group of expos at an event. Expo reports may be provided that describe booths, virtual exhibits, vendors, brands, products, and any other expo materials on display for the expo attendees. Furthermore, expo virtual event analytics may be provided that present any virtual event analytics related to number of attendees to an expo event virtual hall, each expo booth, interactions from attendees, and any other virtual event analytics that may be useful at expos.

When the user has completed creating the event, the user may publish the event. The event may be published at any time after minimum requirements have been met. In some embodiments, the event may be created with at least one stage, session, networking connection, and expo, and at least one presenting user along with a designation of ticket types and prices and a landing page for attending the event. In some embodiments, only one of a stage, session, network connection, and expo is required for an event to be published. In some embodiments, organizers may create any combination of event activities such as, for example, there may be only one session and networking opportunities, or one expo, two sessions, and networking opportunities. Any arrangement of event activities may be created by the organizer.

Figure 9:
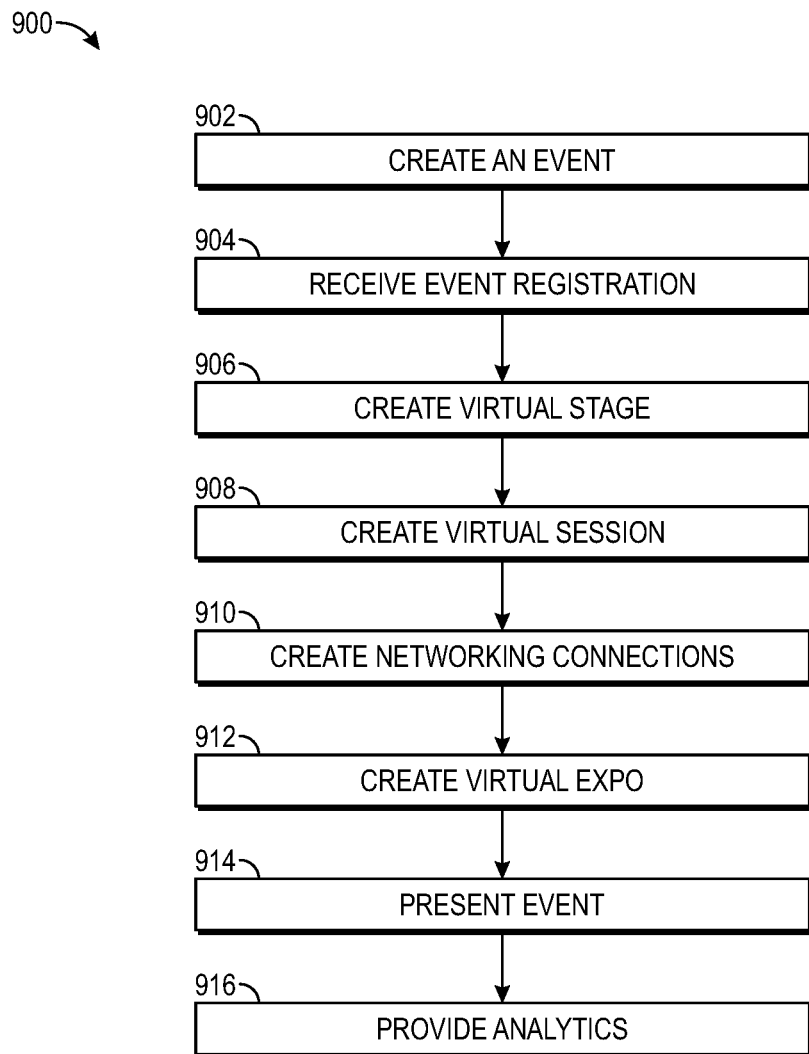
FIG. 9 depicts an exemplary process for creating an event by the virtual event hosting system.

FIG. 9 depicts an exemplary method for creating an event by a user interface generally referenced by the numeral 900. At step 902, the virtual event hosting system may receive, by the user, input indicative of creating an event as described in embodiments above. The virtual event hosting system may present input fields and request information such as, for example, event name, schedule, ticketing information, and the like. An event may be generated from the input received from the user. In some embodiments, schedules for specific interactions at the event are generated for the attendees based on attendee historical information and preferences.

At step 904, the virtual event hosting system may receive registration for the event as described in embodiments above. The user may input ticket types and cost associated with the ticket types. For example, the ticket types may be regular, premium, and VIP. The cost of the tickets may correlate to a level of access that the ticket provides. For example, the user may create a regular ticket that an attendee may use to access the event with the exception of the keynote. Similarly, the VIP ticket may receive full access to the event and a 3 min live or virtual meet-and-greet with the keynote speaker. Any arrangement of ticket registrations and cost may be imagined.

At step 906, the virtual event hosting system may generate a stage for supporting a presentation from the presenting user that may be viewed virtually by the attendees as described in embodiments herein. The stage may be a real-life stage with a presenting user on the stage with cameras capturing the presentation and providing a live feed to the attendees viewing remotely. In some embodiments, the stage is only a virtual presentation and there are no attendees present at the presenting user's location. The stage may refer to the virtual presentation of the presenting user presented by video and audio broadcast to the attendees.

At step 908, the virtual event hosting system may generate a session supporting two-way interaction between the presenting user and the attendees of the presentation as described in embodiments herein. The presenting user may receive questions from the attendees virtually and respond. The virtual session is set up for two-way communication and, in some embodiments, both the presenting user and the speaking attendee may be visible on the display presented by the user interface. In some embodiments, the presenting user may have a live audience and the attendee may communicate with the live audience.

At step 910, the virtual event hosting system may generate networking connections based on the user input as described in embodiments herein. The user may elect to include networking connections that may be generated automatically by randomly selecting event attendees to interact via video and audio broadcasting provided by the virtual event hosting system. In some embodiments, the user may select attendees to connect and in other embodiments, the attendees may request networking connections with other attendees.

At step 912, the virtual event hosting system may generate an expo based on the user inputs as described in embodiments herein. Booths may be provided virtually for the attendees of the event. The attendees may select a booth and view a short video as well as promotional products. In some embodiments, the attendees may interact with the booth by selecting and purchasing or ordering products.

At step 914, when the user is finished creating the event, the user may publish the event instantly or by setting a publishing schedule. In some embodiments, the user may market the event on other events prior to publishing to bring attention to the event. In some embodiments, the event may be marketed on third-party websites promoting a launch date of the event or when tickets for the event go on sale. When the event is published, registered users may attend.

At step 916, the user may set up and view virtual event analytics associated with the event as described above. The virtual event analytics may provide the user valuable data related to attendance and time spent viewing the events. The virtual event analytics may provide the user with valuable information on how to schedule and price future events. Furthermore, the user may adjust ticket prices and scheduling during the event to attract attendees to various virtual locations throughout the event.

Any detailed description provided of the processes described above may be incorporated into the method described herein. Steps of the above-described method may be performed in any arrangement without departing from the scope of the process.

Attending an Event

In some embodiments, the user may be an attendee of the event. The user may create a profile, or the host profile created for the user may be used as an attendee. As depicted in FIG. 2 above, the user may be presented with events that may be likely to be interesting to the user based on the stored profile of the user and a history of interactions by the user with the virtual event hosting system. Furthermore, the stored profile of the user may store any data obtained from any associated systems and applications through network connections and interactions between applications on the computing system. In some embodiments, these interactions may be click throughs, previous events attended, previous events hosted, amount of time spent at events, amount of time viewing event descriptions, and the like. In some embodiments, data from third-party websites may be used to determine events to present to the user. User interactions with associated applications may be stored on the user profile as well. Furthermore, the user may search for specific events or topics, and events related to the topics search may be presented to the user.

Figure 10:
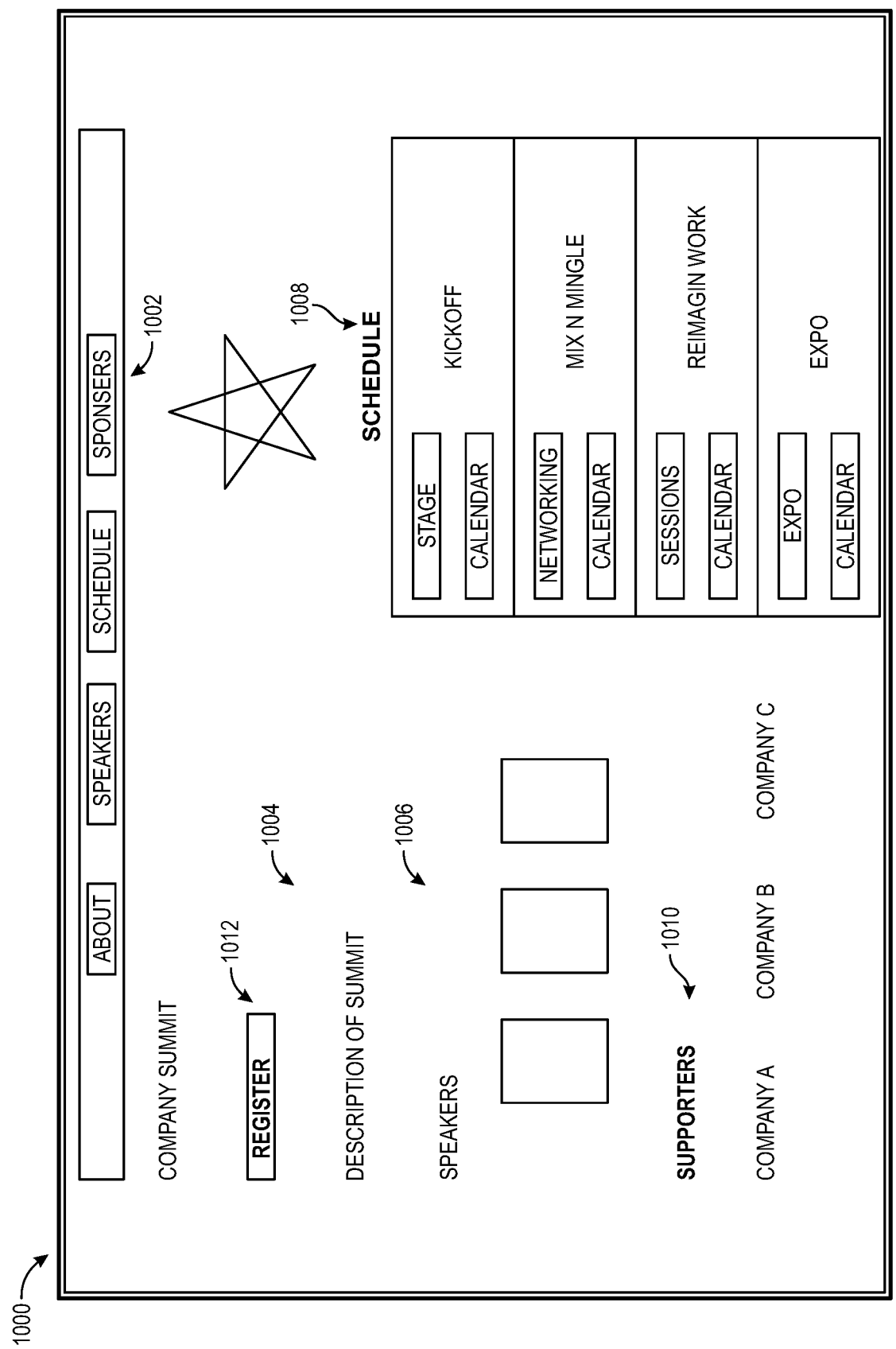
FIG. 10 depicts an embodiment of an attendee registration page.

FIG. 10 illustrates an exemplary event registration page 1000 as created in embodiments above. In some embodiments, event registration page 1000 comprises header menu 1002, description 1004 about a company summit, presenting users 1006 at the company summit, schedule 1008 of the company summit, and sponsors 1010 of the company summit. In some embodiments, the user may select any of the items on header menu 1002 to view the contents. In some embodiments, the user may scroll the length of event registration page 1000 and the items viewable by header menu 1002 may be provided on event registration page 1000 as shown. In some embodiments, selection of each item may display the items individually on separate pages.

Furthermore, event registration page 1000 may provide a registration button 1012 for selection and registration to the company summit event. The user may register as a guest user and input basic information such as name and contact information. In some embodiments, the profile of the user may be accessed automatically to register the user to the company summit event. In some embodiments, the user may pay money to register to the company summit. The profile of the user may have a stored account from which the money may be pulled, or the user may provide account information to pay for the registration.

Figure 11:
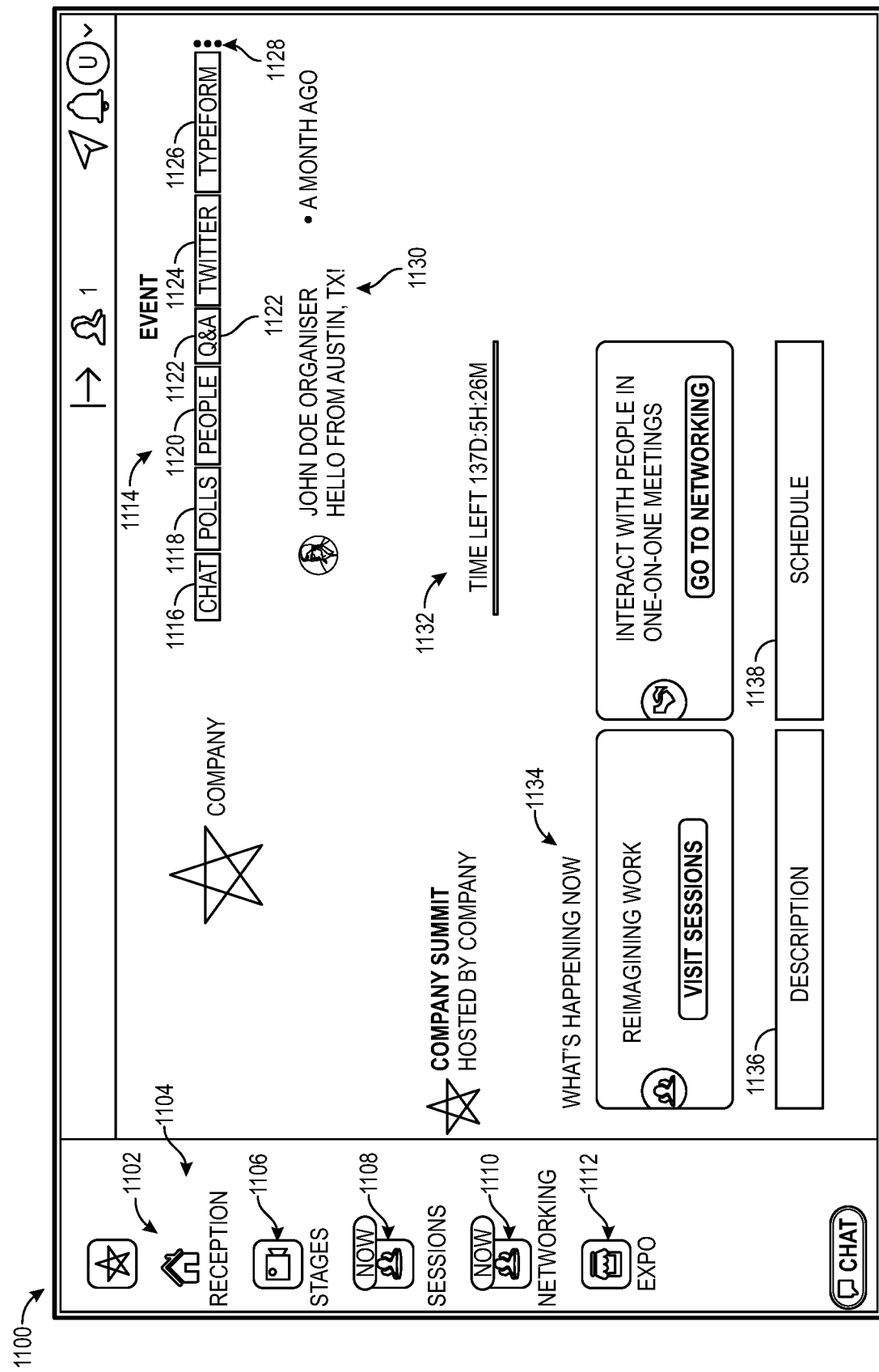
FIG. 11 depicts an embodiment of an attendee landing page.

When the user is registered, the user may attend the company summit event. FIG. 11 illustrates an exemplary landing page, or reception page 1100, for the company summit event. In some embodiments, reception page 1100 comprises side menu 1102 comprising items for selection for the user such as, for example, reception 1104, stages 1106, sessions 1108, networking 1110, and expo 1112. Side menu 1102 items are discussed in detail below. Furthermore, reception page 1100 may comprise the company current or live events 1134, summit description 1136, the event schedule 1138, time left in the event 1132, attendees of the event, notifications for the user, a link to the user profile, and may display event engagement menu 1114 for the user to engage with other organization members and/or attendees.

In some embodiments, event engagement menu 1114 is provided on reception page 1100. Event engagement menu 1114 may comprise chats 1116, polls 1118, people 1120, question and answer (Q&A) 1122, social media (SM) 1124, surveys 1126, and a menu selection 1128 that allows the user to activate and deactivate event engagements. When chats 1116 is selected for activation, the user may chat with any attendee and any presenting user that is registered for the event and is eligible for chat. Any user may make themselves either available to chat or unavailable.

In some embodiments, the user may select polls 1118 and poll questions, as described above, may appear in engagement field 1130. The user may select from a list of multiple-choice responses to the polls or provide a custom written response. In some embodiments, polls are automatically provided to the user at the conclusion of stages, sessions, networking engagements, expos, or the like.

In some embodiments, the user may select people 1120 from event engagement menu 1114. When people 1120 is selected, a list of names, or personal identifiers, for all people associated with the event may be listed in engagement field 1130. In some embodiments, information describing the people may be displayed, such as, for example, attendee or presenting user. In some embodiments, the people displayed may be team members of the organization and the descriptions may be the field of work such as, for example, accountant, engineer, CFO, and the like. The identifier of a person may be selected, and the user may be presented with a set of options such as, for example, video call, schedule a meeting, send a message, and the like. The user may select an option and contact the person.

In some embodiments, Q&A 1122 may be selected, and the user may be presented with a question in engagement field 1130. The question may selectively be displayed to the presenting user, team members of the organization, attendees of the company summit, and any other group or individual associated with the company summit.

In some embodiments, the user may select SM 1124. SM 1124 may display a feed from a social media timeline in engagement field 1130. For example, a chat field may be linked and displayed using a third-party social media platform such as TWITTER™, FACEBOOK™, SNAPCHAT™, or any other social media application.

In some embodiments, surveys 1126 may be selected. Surveys 1126 may link to a third-party survey application that conducts integrated web-based surveys for tracking user experience on the virtual event hosting system. The data gathered and analyzed may be provided to the virtual event hosting system for analysis and feedback to the host of the company summit as described in embodiments above.

In some embodiments, the user may select items from side menu 1102. Users may select stages 1106. When the user selects stages 1106, a list of available stages may be presented to the user. The user may select one of the stage options and attend a stage presentation virtually. The stage options may be any of the presentations, keynotes, performances, and fireside chats as listed above.

Figure 12:
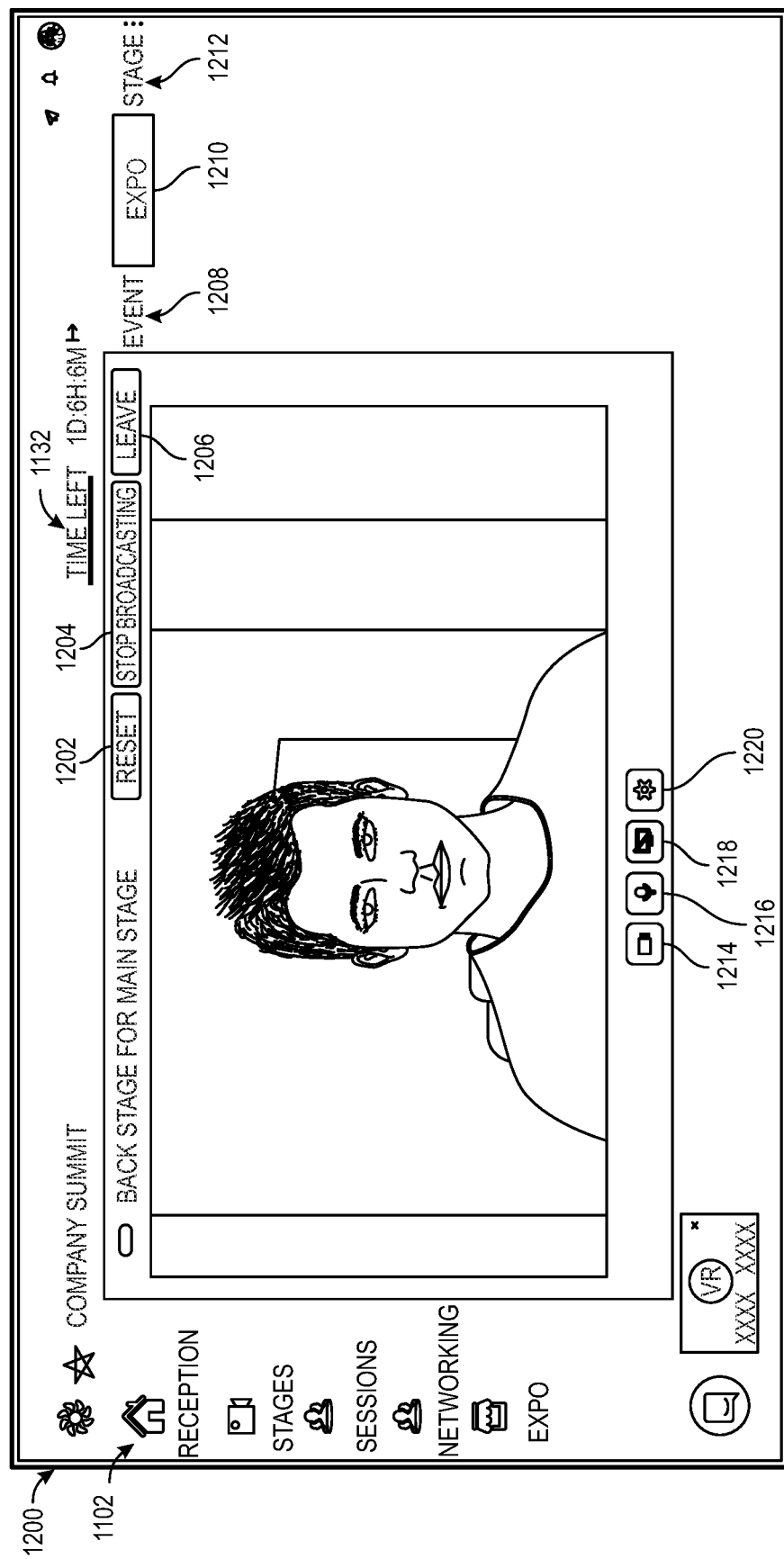
FIG. 12 depicts an embodiment of a video display for engaging presenting users and attendees of the event.

FIG. 12 illustrates an exemplary video display 1200 that, in some embodiments, may be accessed by the user for stage presentations, sessions, networking, expos, and any other video feeds that may be accessed by the attendee. Video display 1200 may be provided by any video player accessible by the virtual event hosting system. In some embodiments, the video player may comprise any selections for the user to add and display other user's via the video player. Video display 1200 may be arranged in any way. In some embodiments, video display 1200 may be provided by any application or integration accessible by the virtual events system. In some embodiments, when a stage is selected, the user may view the presentation muted and with no video, or the user may share video of the user and unmute such that the user may add to the presentation. The video display 1200 may provide options for reset button 1202, broadcast button 1204, leave button 1206, and any other options. In some embodiments, reset button 1202 may function to reset the stage presentation when a stage is broken such as, for example, if the presentation is frozen or if a network signal is weak or is lost.

In some embodiments, broadcast button 1204 may be selected to share or stop sharing the user video taken by a user camera during sessions and networking as described herein. Any user may select broadcast button 1204 to conduct video calls during the event. Furthermore, leave button 1206 may be presented to the user to leave the stage presentation. When leave button 1206 is selected, the user may leave the stage and be routed back to reception page 1100 or any other page of the event.

In some embodiments, engagement field 1130 is provided including options for event 1208, which may provide a chat between attendees, expo selection 1210, and stage 1212. Stage 1212, as described above, allows presenting users to present to attendees and may provide identifiers of attendees and the presenting user as well as the presentation topic and links to attend sessions, networking, and expos associated with the stage. In some embodiments, a backstage selection allows presenting users to rehearse or otherwise prepare without attendees. Presenting users may present and chat with other presenting users and organizers that the presenting user allows into the backstage presentation. This allows presenting users and organizers to prepare to go live to attendees prior to the live presentation. In some embodiments, any users may connect by video display 1200.

Continuing with FIG. 12 where the user is an attendee and is broadcasting during a session, the user may select broadcast button 1204 to start and stop the broadcast. In some embodiments, the user may select from a plurality of sessions presented by the user interface. Any sessions that may be included with the company summit event may be included for attendance by the registered attendee. Each session may be presented with a brief description and an indication on the status of the session such as, for example, open, moderated, private, or the like. In some embodiments, when the session is underway, a number of people viewing may be displayed. In some embodiments, only attendees and presenting users are displayed while they are speaking. The user may select a session for access to the session and video display 1200 may be presented. The user may interact with the session by selecting the video icon 1214 for starting and stopping the video feed, microphone icon 1216 for allowing the user audio, the display icon 1218 for displaying the user's video, and the tools icon 1220 for displaying customizable tools for the user. In some embodiments, attendees may create their own sessions to engage with other attendees.

In some embodiments, the user may register for networking and the virtual event hosting system presents a list of attendees that the user may message to request communication. In some embodiments, the virtual event hosting system automatically connects the user to attendees for networking. In some embodiments, the connections may be random or may be based at least in part on historical data, profile data, and any virtual event analytics as described above. In some embodiments, the user may utilize video display 1200 to connect with the other attendees and/or presenting users. Networking may be provided by ticket type or by individual purchase.

Furthermore, in some embodiments, a designated amount of time may be allocated to each network connection. For example, a presenting user or attendee may meet one-on-one with 20 different attendees. The network connections may only last a total of 3 minutes allowing the presenting user/attendee to meet with everyone but allocating a same amount of time to each interaction and not taking too much time. The time limits may be designated by the presenting user/attendee or may be purchased for varying amounts of money. For example, 3 minutes may be $20, 5 minutes may be $30, and so forth. In some embodiments, the network connections are only between attendees and the presenting users are only accessible via the sessions as described above.

In some embodiments, the user may access booths of an expo and view pre-recorded videos promoting companies and products and be able to purchase said products. The expo booths may present videos and images. For example, videos by the company of the company summit may be provided by accessing a company summit booth and may provide access to feature events, products, and a general description of the company.

Furthermore, in some embodiments, integrations may be provided for the user to view. Integrations, as described above, may provide access to documents, videos, images, and other tools that the user may interact with to provide the user a complete experience with the expo. For example, the integration may be a slide deck presentation that may utilize the slide deck platform that may be downloaded and run directly on the virtual event hosting system. In some embodiments, a snapbar may be accessible for users to provide images such as, pictures of themselves or others to engage other attendees. Integrations may provide filters to modify the pictures taken by the team members and/or attendees. In some embodiments, as described above screen and content sharing may be utilized as well as accessing content on other user's screens when allowed.

Figure 13:
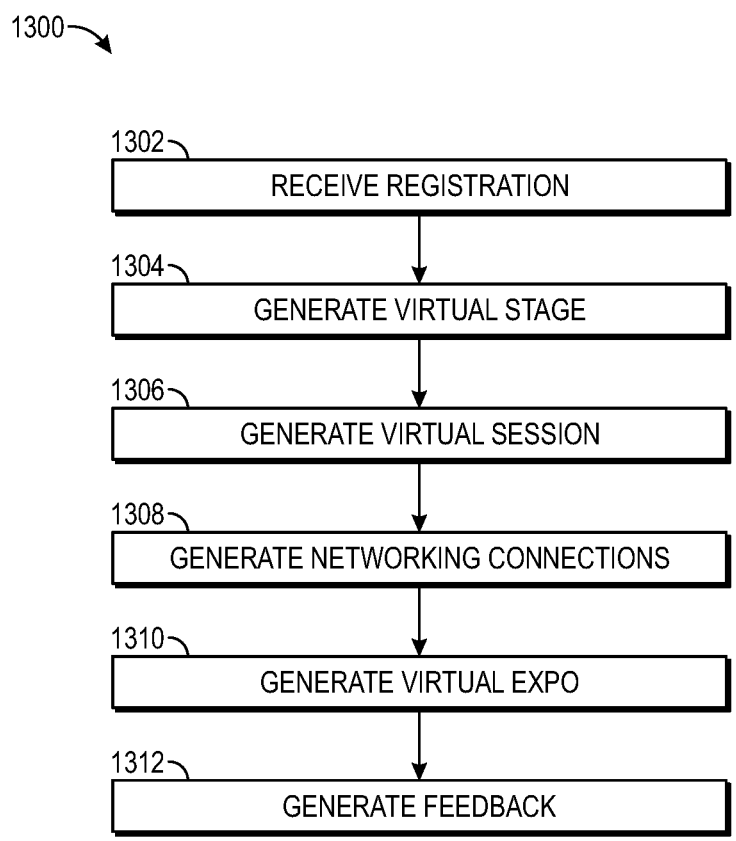
FIG. 13 depicts an embodiment of a process for attending an event.

FIG. 13 depicts an exemplary embodiment of a method of an attendee attending the event generally referenced by the numeral 1300. At step 1302, the virtual event hosting system may receive a registration from the attendee by the user interface as described in embodiments above. The attendee may provide personal information for creating a profile such as, for example, name, location, interests, reasons for registering for the event, and the like. The attendee may select a ticket type that provides the attendee access to items at the event that the attendee desires to see. The attendee may also receive a customized schedule for the event automatically determined and provided by the virtual event hosting system.

At step 1304, the virtual event hosting system may receive selection of a stage from the attendee and the stage may be presented to the user as described in embodiments above. The attendee may wish to view the presentation of the presenting user of the stage and may select the stage of the event. The attendee may attend by selecting the event at the scheduled time and a video display providing a live feed from the stage may be displayed on the user interface of the attendee. Furthermore, the attendee may be provided with a chat field for communicating with other attendees during the event.

At step 1306, the virtual event hosting system may receive a selection of a session associated with the stage by the attendee by the user interface and the session may be presented to the user as described in embodiments above. The attendee may hear and view the presenting user and other attendees as the other attendees engage. The attendee may request to ask a question and be queued. The attendee may communicate with the presenting user and the other attendees may hear and view the attendee by the user interface presented to the other attendees. In some embodiments, the attendee may elect to be heard but not seen.

At step 1308, the virtual event hosting system may receive a networking selection by the attendee by the user interface. The attendee may wish to engage with other attendees to discuss the presentation. The networking connection may provide a virtual environment for the attendees to meet. The networking connection may connect attendees randomly or based on similarities of the attendees determined from profile and historical information as described above. In some embodiments, the attendee may request a connection with a specific attendee of the event.

At step 1310, the virtual event hosting system may receive a selection, by the user interface, of an expo for attendance by the attendee. The expo may present a plurality of booths for attendance. Each booth may be associated with a company or presenting user at the event. The booths may present videos, images, and descriptions of companies and products. The attendee may interact with a booth to receive or request more information or purchase a product.

At step 1312, the virtual event hosting system may follow up with the attendee by providing questionnaires, polls, and surveys. Any virtual event analytics, polls, and interactions between the virtual event hosting system and the attendee may occur at any point during any of the above-described method steps. The results may be tabulated or presented in any graphical format and presented to the user such that the user may use the information to create more engaging events in the future.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A method of creating a virtual event by an event organizer and presenting the virtual event to an event attendee, the method comprising:
    receiving, from the event organizer, creation of the virtual event,
    wherein the virtual event comprises stages, sessions, network connections, expos and one or more presenters;
    receiving registration creation information including ticket information for attending the virtual event;
    creating a stage supporting a presentation from a presenter of the one or more presenters to a plurality of attendees including the event attendee;
    creating a session supporting live interaction between the presenter and the plurality of attendees;
    creating the networking connections supporting interaction between the presenter and the event attendee;
    creating an expo providing virtual booths comprising sponsor materials;
    receiving, from the event attendee, a registration for the virtual event;
    receiving, by the event attendee, a selection of the stage for viewing the presentation;
    presenting a private connection between the presenter and the event organizer to rehearse the presentation prior to presenting the presentation live to the plurality of attendees;
    presenting a video of the presentation in real time to the event attendee;
    receiving a selection of the session by the event attendee;
    connecting, by video, the event attendee with the presenter;
    receiving a selection of the network connections by the event attendee;
    receiving a selection of the expo by the event attendee; and
    presenting, to the event attendee, an expo video displaying information indicative of a company associated with the virtual event.

2. The method of claim 1, wherein the network connections comprise a one-to-one video connection between the presenter and the event attendee.

3. The method of claim 1, further comprising connecting, by video, the plurality of attendees in the session.

4. The method of claim 1, further comprising providing, to the event attendee, access to the virtual event, the session, the network connections, or the expo, based on a ticket type of the event attendee.

5. The method of claim 1, further comprising:
    tracking attendance at the virtual event and amount of time of the attendance at the virtual event; and
    presenting the attendance and the amount of time of the attendance to the event organizer.

6. The method of claim 1, further comprising:
    recording the presentation; and
    presenting the recorded presentation to attendees after the virtual event has concluded.

7. One or more non-transitory computer-readable media storing computer executable instructions that, when executed by a processor, perform a method of creating a virtual event for presentation to attendees of the virtual event, the method comprising:
    receiving, from a user, creation of the virtual event,
    wherein the virtual event comprises stages, sessions, network connections, expos, and one or more presenters;
    receiving registration information including ticket information for attending the virtual event;
    creating a stage supporting a presentation from a presenter of the one or more presenters to a plurality of attendees;
    creating a session supporting live interaction between the presenter and the plurality of attendees;
    creating the network connections supporting interaction between a first attendee and a second attendee of the plurality of attendees;
    creating an expo providing virtual booths comprising expo videos;
    providing a pre-recorded expo video with a description of a company associated with the virtual event; and
    presenting the virtual event to the plurality of attendees of the virtual event.

8. The media of claim 7, wherein the computer-executable instructions are further executed to perform creating a guided schedule for the first attendee based on interests of the first attendee.

9. The media of claim 8, wherein the interests of the first attendee are determined by analyzing profile data and a history of attended events of the first attendee.

10. The media of claim 7, wherein the computer executable-instructions are further executed to perform:
    collecting data indicative of movements of the first attendee throughout the virtual event;
    analyzing the data; and
    providing results of the analyzing to the user.

11. The media of claim 10, wherein the computer executable-instructions are further executed to perform:
    accessing applications on a mobile device of an in-person attendee;
    collecting in-person data indicative of in-person movements of the in-person attendee in a venue of the virtual event;
    analyzing the in-person data; and
    providing in-person results of the analyzing of the in-person data to the user.

12. The media of claim 7, wherein the first attendee attends the expo after the virtual event has concluded and a pre-recorded video of the presentation is accessed in a section of previously attended events comprising replays.

13. A system for presenting a virtual event for attendance by a user, the system comprising:
    a processor;
    a data store;
    a display for presenting a graphical user interface to the user; and
    one or more non-transitory computer-readable media storing computer-executable instructions that, when executed by the processor, perform a method of presenting the virtual event, the method comprising:
    receiving input from the user indicative of a registration for the virtual event;
    receiving, by the user, a selection of a stage for viewing a presentation of a presenter, wherein the presentation is presented to in-person attendees;
    receiving a selection of a session by the user;
    connecting the user with the presenter of the presentation by video in the session;

connecting, by video, the user with an attendee of the virtual event;
communicatively connecting the user in the session via a live broadcast to a venue of the presentation and the in-person attendees;
receiving a selection of an expo by the user; and
presenting, to the user, an expo video displaying information indicative of a company associated with the presenter.

14. The system of claim 13, wherein the presenter presents at the venue to the in-person attendees; wherein the presentation is stored for future viewing by registered users.

15. The system of claim 13, wherein the presentation includes at least one integration from a third-party application.

16. The system of claim 13, wherein the computer-executable instructions are further executed to perform:
presenting polls or surveys to the user; and
tabulating results of the polls or the surveys and presenting the results to a host of the virtual event.

17. The system of claim 13, wherein the computer-executable instructions are further executed to perform:
recording the presentation; and
presenting the recorded presentation to attendees after the virtual event has concluded.

18. A method of creating a virtual event by an event organizer and presenting the virtual event to an attendee, the method comprising:
receiving, from the event organizer, creation of the virtual event;
creating a stage supporting a presentation from a presenter to a plurality of attendees,
wherein the presentation from the presenter is presented to a plurality of in-person attendees at a venue;
creating a session supporting live interaction between the presenter and the plurality of attendees;
receiving, by the attendee, a selection of the stage for viewing the presentation;
presenting a video of the presentation in real time to the attendee via the stage;
receiving a selection of the session by the attendee; and
communicatively connecting, the attendee via the session with the presenter and the plurality of in-person attendees at the venue of the presenter.

\* \* \* \* \*